United States Patent [19]
Light

[11] Patent Number: 6,025,434
[45] Date of Patent: Feb. 15, 2000

[54] PROCESS FOR MAKING AN ADHESIVE AND PRODUCT THEREOF

[76] Inventor: Kevin W. Light, 785 Swan La., Caton, Ga. 30115

[21] Appl. No.: 09/140,502

[22] Filed: Aug. 26, 1998

[51] Int. Cl.[7] .............................. C08J 3/00; C08K 3/20; C08L 75/00; C08F 8/30; C08F 283/04
[52] U.S. Cl. ..................... 524/590; 524/507; 524/589; 525/123; 525/127; 525/455
[58] Field of Search .................................. 524/507, 590, 524/589; 525/123, 127, 455

[56] References Cited

U.S. PATENT DOCUMENTS

| | | |
|---|---|---|
| 3,917,554 | 11/1975 | Inoue . |
| 3,947,403 | 3/1976 | McCready . |
| 3,962,498 | 6/1976 | Owston . |
| 4,217,254 | 8/1980 | Legue . |
| 4,256,615 | 3/1981 | Legue . |
| 4,340,682 | 7/1982 | Legue . |
| 4,396,738 | 8/1983 | Powell . |
| 4,569,972 | 2/1986 | Legue . |
| 4,740,424 | 4/1988 | Schumacher . |
| 4,855,001 | 8/1989 | Damico . |
| 4,889,915 | 12/1989 | Brauer . |
| 4,891,269 | 1/1990 | Markevka . |
| 4,959,398 | 9/1990 | Oka . |
| 5,036,143 | 7/1991 | Brauer . |
| 5,057,568 | 10/1991 | Nowicki . |
| 5,069,947 | 12/1991 | Hopperdietzel . |
| 5,075,407 | 12/1991 | Cody . |
| 5,091,239 | 2/1992 | Przeworski . |
| 5,359,735 | 11/1994 | Stockwell . |
| 5,391,610 | 2/1995 | Comert . |

*Primary Examiner*—Patrick Niland
*Attorney, Agent, or Firm*—Richard C. McComas

[57] ABSTRACT

A process for forming an adhesive composition comprising a methyl chloride solvent, an acrylic-based copolymer and a prepolymer of an isocyanate, an ethylene oxide-capped diol and ethylene oxide-capped triol. An adhesive product is disclosed. The adhesive is used in large-scale outdoor carpet applications.

14 Claims, 1 Drawing Sheet

PROCESS FOR MAKING AN ADHESIVE AND PRODUCT THEREOF

BACKGROUND OF THE INVENTION

1. Field of the Invention

The present invention relates to a process for making an adhesive, and the product of that process. More particularly, the present invention provides an adhesive for carpet and carpet like applications. Most particularly, the process and product of the present invention provide a non-flammable sprayable adhesive having high green strength, that may be used in laying outdoor carpet and other similar uses.

2. Brief Description of the Related Art

Adhesive compositions of various types have been disclosed for commercial industrial uses, such as bonding metal or plastic materials. For example, U.S. Pat. No. 3,917,554 (Inoue et al.) discloses an adhesive composition containing no urethane component. U.S. Pat. No. 3,947,403 (McCready) discloses a two component adhesive that requires a curative to apply. U.S. Pat. No. 3,962,498 (Owston) discloses an automotive adhesive that does not contain an acrylic copolymer. U.S. Pat. Nos. 4,217,254; 4,256,615; 4,340,682; 4,569,972 (Legue and Legue et al.) disclose an adhesive containing a chlorinated rubber and no acrylic copolymer. U.S. Pat. No. 4,396,738 (Powell et al.) discloses aqueous adhesive compositions that requires a surfactant for emulsion stability. U.S. Pat. No. 4,740,424 (Schumacher et al.) discloses an adhesive not containing an acrylic copolymer. U.S. Pat. No. 4,855,001 (Damico et al.) discloses acrylic-based adhesives requiring a transition metal. U.S. Pat. Nos. 4,889,915 and 5,036,143 (Brauer et al.) disclose urethane adhesives that do not contain an acrylic copolymer. U.S. Pat. No. 4,891,269 (Markevka et al.) discloses an adhesive that does not use a solvent to dissolve an acrylic copolymer. Additionally, Markevka et al. discloses an adhesive that requires high temperatures and forms a solid composition. U.S. Pat. No. 4,959,398 (Oka et al.) discloses a spot adhesive composition that does not contain a urethane component. U.S. Pat. No. 5,057,568 (Nowicki et al.) discloses polyurethane adhesive that does not contain an acrylic copolymer. U.S. Pat. No. 5,069,947 (Hopperdietzel) discloses a method for laminating a plastic web that does not contain urethane or acrylic copolymer components. U.S. Pat. No. 5,075,407 (Cody et al.) discloses a foamable thermosetting polyurethane adhesive that requires high temperatures and does not use a solvent to dissolve an acrylic copolymer. U.S. Pat. No. 5,091,239 (Przeworski et al.) discloses adhesives containing thermoplastic polyurethane that does not contain an acrylic copolymer. U.S. Pat. No. 5,359,735 (Stockwell) discloses a surface coating rubber material that does not contain an acrylic copolymer or urethane. U.S. Pat. No. 5,391,610 (Comert et al.) discloses a sealant that does not use a chloride-based solvent or acrylic copolymer.

Although, the above-identified patents describe several types of adhesive compositions, the disclosure of those patents does not solve adhesive needs for laying outdoor carpeting. Outdoor carpet laying in a stadium area gives rise to specialized adhesive requirements not disclosed within the known adhesives. The particular requirements and associated problems have resulted in a need for new approaches in acrylic adhesive development designed for the specific application and conditions in which the outdoor adhesive is employed, particularly in the application of the adhesive over large areas and durability in bonding carpet to a surface material once the adhesive is set. The outdoor adhesive compositions need to provide for large quantities of the adhesive that are readily transportable while remaining spreadable until applied to a carpet or base surface. The adhesive composition also should provide non-flammable characteristics for large-scale use. The adhesive composition also is subjected to forces not normally found in indoor or residential carpet use. These forces include changing weather conditions, high stress recreational use, and large contiguous carpeted areas of extremely thick carpet.

In view of the foregoing, improvements in adhesives for carpet adhesion have been desired. It has been desired to provide an adhesive composition that addresses the particular requirements for outdoor carpeting. There is a need for an adhesive composition which addresses the specific application of an adherent for outdoor carpet that has durability under long term use, exposure to changing climate conditions, and high use wear.

SUMMARY OF THE INVENTION

The present invention provides a process for forming a non-flammable adhesive composition comprising the steps of purging moisture from a first container containing a chloride-based solvent; mixing an acrylic copolymer with the chloride-based solvent in the first container; blending the mixed acrylic copolymer and solvent sufficiently to dissolve the acrylic copolymer into an acrylic solvent mixture; purging moisture from a second container containing an isocyanate; mixing an ethylene oxide-capped diol and an ethylene oxide-capped triol into the isocyanate in the second container to form a prepolymer mixture; blending the prepolymer mixture sufficiently to form a homogeneous prepolymer mixture; heating the homogeneous prepolymer mixture to a temperature of from about 140° F. to about 170° F. for a time period of from about 3 hours or more; cooling the heated homogeneous prepolymer mixture to a temperature of from about 65° F. to about 100° F.; mixing the cooled homogeneous prepolymer mixture with the acrylic solvent mixture; and, blending the mixed homogeneous prepolymer mixture and acrylic solvent mixture sufficiently to form a homogeneous adhesive composition.

The present invention further provides a process for forming a non-flammable adhesive composition comprising the steps of capping a methyl chloride solvent in a first container with from about 5 psi to about 15 psi nitrogen; mixing from about 10 to about 15 percent by weight of a methyl-methacrylate and butadiene copolymer into the capped methyl chloride solvent; blending the mixed acrylic copolymer and solvent sufficiently to dissolve the acrylic copolymer into an acrylic solvent mixture; capping an isocyanate in a second container with from about 5 psi to about 15 psi nitrogen; mixing from about 18 to about 21 percent by weight of an ethylene oxide-capped diol having an average molecular weight of from about 3000 to about 5000 with from about 14 to about 17 percent by weight of an ethylene oxide-capped triol having an average molecular weight of from about 5000 to about 7000 to form a diol-triol mixture; stirring and heating the isocyanate to a temperature of from about 140° F. to about 170° F.; mixing the blended diol-triol mixture into the stirred and heated isocyanate in the second container, wherein a prepolymer mixture is formed; blending the prepolymer mixture sufficiently to form a homogeneous prepolymer mixture; heating the homogeneous prepolymer mixture to a temperature of from about 140° F. to about 170° F. for from about 3 hours to about 5 hours; cooling the homogeneous prepolymer mixture to a temperature of from about 65° F. to about 100° F.; mixing the cooled homogeneous prepolymer mixture with the acrylic solvent mixture; and, blending the mixed homogeneous prepolymer mixture and acrylic solvent mixture sufficiently to form a homogeneous adhesive composition.

Additionally, the invention provides an adhesive product made by the process comprising the steps of purging moisture from a first container containing a chloride-based solvent; mixing an acrylic copolymer with the chloride-based solvent in the first container; blending the mixed acrylic copolymer and solvent sufficiently to dissolve the acrylic copolymer into an acrylic solvent mixture; purging moisture from a second container containing an isocyanate; mixing an ethylene oxide-capped diol and an ethylene oxide-capped triol into the isocyanate in the second container to form a prepolymer mixture; blending the prepolymer mixture sufficiently to form a homogeneous prepolymer mixture; heating the homogeneous prepolymer mixture to a temperature of from about 140° F. to about 170° F. for a time period of from about 3 hours or more; cooling the heated homogeneous prepolymer mixture to a temperature of from about 65° F. to about 100° F.; mixing the cooled homogeneous prepolymer mixture with the acrylic solvent mixture; and, blending the mixed homogeneous prepolymer mixture and acrylic solvent mixture sufficiently to form a homogeneous adhesive composition.

DETAILED DESCRIPTION OF THE PREFERRED EMBODIMENT

Figure 1:
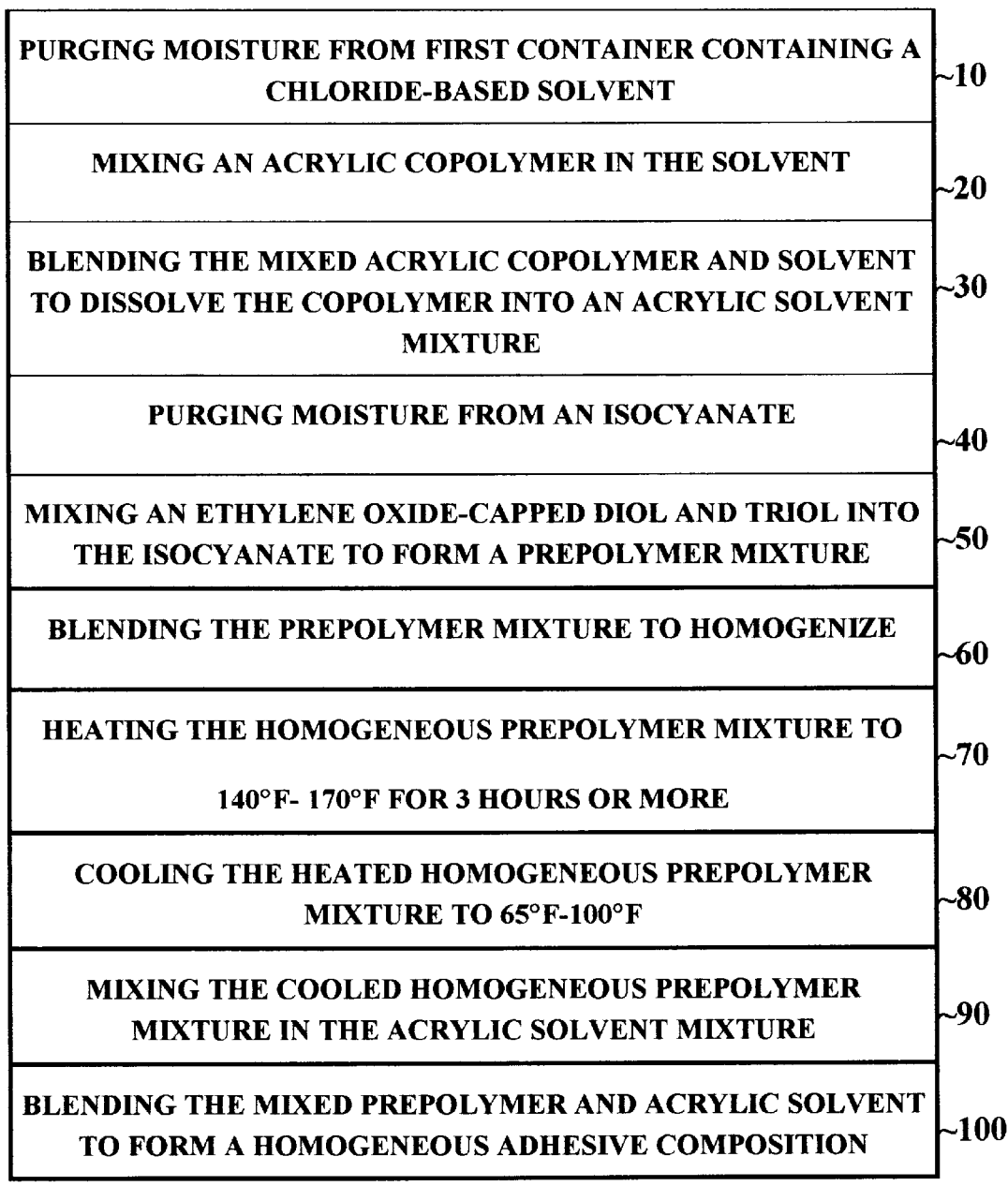
FIG. 1 is a schematic diagram of the preferred embodiment of the process of the present invention.

The present invention is a process for making an adhesive, and the adhesive product of that process. The adhesive is used to adhere outdoor carpet to a substrate, which includes surfaces and/or flooring which are normally used for laying carpet and/or carpet padding, such as concrete, wood, foam, rubbers and/or other such support materials or surfaces. Outdoor carpeting includes carpeting, artificial grass, and other synthetics normally used for covering outside surfaces. The present invention provides a non-flammable adhesive particularly suitable for use in large-scale outdoor carpeting operations. Accumulation of explosive or flammable gases presents a hazard for large amounts of adhesive used within dome stadiums. However, the large-scale use of spray adhesives in a confined area facilitates carpet laying. Within other large areas, such as open stadiums, seasonal weather changes impact carpet adhesion differently than indoor type carpet applications. The areas of outdoor-adhered carpet extend over hundreds of feet, increasing the critical areas where repetitious weather variations of humidity and ultraviolet (UV) light corrode the adhesive binding. Normal indelicate continuous use of the outdoor carpet also wears against the adhesive binding.

As seen in FIG. 1, a preferred embodiment of the process for forming a non-flammable adhesive composition comprises the steps of purging 10 moisture from a first container containing a chloride-based solvent; mixing 20 an acrylic copolymer with the chloride-based solvent in the first container; blending 30 the mixed acrylic copolymer and solvent sufficiently to dissolve the acrylic copolymer into an acrylic solvent mixture; purging 40 moisture from a second container containing an isocyanate; mixing 50 an ethylene oxide-capped diol and an ethylene oxide-capped triol into the isocyanate in the second container to form a prepolymer mixture; blending 60 the prepolymer mixture sufficiently to form a homogeneous prepolymer mixture; heating 70 the homogeneous prepolymer mixture to a temperature of from about 140° F. to about 170° F. for a time period of from about 3 hours or more; cooling 80 the heated homogeneous prepolymer mixture to a temperature of from about 65° F. to about 100° F.; mixing 90 the cooled homogeneous prepolymer mixture with the acrylic solvent mixture; and, blending 100 the mixed homogeneous prepolymer mixture and acrylic solvent mixture sufficiently to form a homogeneous adhesive composition. Mixing occurs with the introduction of additionally compounds in combination with at least a first compound. Blending is the continuous agitation of the mixed compounds to uniformly disperse the compounds together within the mixture.

The chloride-based solvent of the present invention comprises a non-flammable compound. The solvent comprises non-aqueous and/or non-alcohol based compounds that are non-reactive with acrylic-based copolymers and/or the prepolymer of the present invention. The solvent has a low molecular weight, while still being capable of dissolving an acrylic-based copolymer and/or prepolymer of the present invention. Preferably the solvent comprises low molecular weight compounds such as methyl chloride, methylene chloride, Methyl-Eze™, 1,1,1-trichloroethane, dichloroethane, chloroform, hydrochloroflorocarbon, and mixtures thereof. More preferably, the solvent comprises methyl chloride or methylene chloride. Most preferably, the solvent comprises methylene chloride. The adhesive composition of the present invention contains sufficient solvent for the application of the adhesive to a surface. Preferably, the adhesive composition comprises from about 5 percent to about 85 percent solvent, more preferably from about 40 percent to about 50 percent solvent, and most preferably from about 42 percent to about 47 percent solvent.

The acrylic-based copolymer of the present invention comprises a compound that imparts flexibility and weight to the adhesive composition. Acrylic-based copolymers are any acrylic polymer or copolymer that provide green strength when used in combination with diol and triol of the present invention. Green strength provides additional grab of the adhesive to the substrates. Examples include acrylate monomers such as acrylic acid, acrylamide, methacrylic acid, methacrylamide, methoxyethyl methacrylate, methyl acrylate, methyl methacrylate, 2-ethylhexyl acrylate, 2-ethylhexyl methacrylate, and other such acrylate monomers known in the art. Preferably, the acrylic-based copolymer comprises methyl-methacrylate and butadiene copolymer. Use of the methyl-methacrylate and butadiene copolymer is preferred because of its elongation properties and cured final hardness. Increasing the amount of the acrylic-based copolymer in the adhesive composition generally increases the green strength and vinyl strength of the adhesive. Preferably, the amount of acrylic-based copolymer ranges from about 5 percent by weight to about 85 percent by weight, more preferably from about 8 percent by weight to about 15 percent by weight, and most preferably from about 10 percent by weight to about 12 percent by weight. Preferably, the acrylic copolymer comprises a molecular weight of from about 200,000 to about 1,000,000, more preferably from about 250,000 to about 500,000, and most preferably from about 350,000 to about 500,000.

The acrylic copolymer is mixed with the chloride-based solvent and blended sufficiently to dissolve the acrylic copolymer into an acrylic solvent mixture. The dissolved acrylic solvent mixture facilitates an efficient combination of the mixture with other compounds of the adhesive composition. Preferably, the mixed solvent and copolymer are blended by stirring for from about 5 minutes to about 40 minutes. Preferably, the acrylic copolymer and solvent are maintained at ambient temperature, more preferably from about 65° F. to about 100° F., and most preferably from about 75° F. to about 85° F.

The solvent and acrylic-based copolymer are mixed in a container that permits the exclusion or purging of moisture from the atmosphere adjacent to the mixture. This purging occurs prior to the introduction of the copolymer into the solvent so that the copolymer remains unreacted or chemically unaltered. Generally, moisture exclusion occurs through displacing the moisture containing ambient air over the solvent with an inert gas, such as nitrogen, argon, helium, and other such gases. Preferably nitrogen is used. The nitrogen caps the solvent at greater than ambient pressure to displace the ambient air with the nitrogen, while maintaining a pressure low enough to introduce the acrylic-based polymer into the solvent. Preferably, the pressure of the capping nitrogen ranges from about 2 psi to about 20 psi, more preferably from about 5 psi to about 15 psi, and most preferably from about 8 psi to about 10 psi. Other methods known in the art to exclude ambient air from the mixture may be used, such as creating a vacuum, with the appropriate use of any particular method being determinable by those skilled in the art. Moisture content of the purged atmosphere adjacent to the solvent is preferably less than from about 0.1 percent, more preferably less than from about 0.005 percent, and most preferably less than from about 0.001 percent.

The adhesive composition of the present invention comprises a prepolymer tackifier. The tackifier has an isocyanate combined with specific polyols which yield desirable characteristics for a dried outdoors adhesive composition adhering a carpet to a substrate. Use of the adhesive for outdoor carpet applications requires a tackifier that provides excellent finished strength, or green strength. For outdoor use, the tackifier also imparts an important weather resistance against changing humidity conditions, ultraviolet (UV) light degradation, and weather and temperature changes. Humidity conditions may range from about zero percent to about 100 percent relative humidity, with repetitious exposure to direct sunlight, rain, snow and other such weather conditions.

The specific polyols of the present invention include a combination of a diol and a triol. The polyol combination has an ethylene oxide-capped diol and an ethylene oxide-capped triol. The polyols are blended with an isocyanate in such a way as to permit semi-equal distribution of both polyols within the adhesive. As each polyol imparts unique qualities to the adhesive composition, an equal distribution of the polyols creates uniform characteristics throughout the composition. Without the uniform character of the polyol distribution, pockets of inferior adhesive composition may be created, causing premature failure of the applied adhesive.

The ethylene oxide-capped diol provides improved tensile and elongation strength. The diol has sufficient molecular weight to provide a degree of tensile and elongation strength suitable of outdoor carpet adhesion. Diols provide softer and more flexible composition and improved elongation and better tear resistance. Preferably, the diol has an average molecular weight of from about 3000 to 7000, more preferably from about 3500 to about 6000, and most preferably from about 3500 to about 5000. The ethylene oxide-capped diol includes such compounds as those obtained from Olin Corporation of Cheshire, Conn. under the tradename Poly-G® 55-28.

The ethylene oxide-capped triol provides increased elongation characteristics and freeze-soft capabilities. The triol has sufficient molecular weight to provide a degree of tensile and elongation strength suitable of outdoor carpet adhesion. Triols provide a stiffness, tougher characteristics, and higher tensile strength. However, a decrease in elongation and flexibility occurs. Preferably, the triol has an average molecular weight of from about 4000 to 8000, more preferably from about 5000 to about 7500, and most preferably from about 6000 to about 7000. Ethylene oxide-capped triol compounds include such compounds as those obtained from Olin Corporation of Cheshire, Conn. under the tradename Poly-G® 85-29.

The prepolymer isocyanate may be any isocyanate that permits proper reaction with the diol-triol combination. These include both aromatic and aliphatic polyisocyanates, such as toluene diisocyanate (TDI), diphenylmethane diisocyanate (MDI), isophyoron diisocyanatae (IPDI), 4,4',4" triphenylmethane triisocyanate, polymethylene polyphenyl isocyanate m-phenylene, 1-chlorophenylene 2,4 diisocyanates, methylene-bis(4-cyclohexylisocyanatae) and their equivalents. Preferably, the isocyanate comprises 4,4' diphenylmethane diisocyanate and/or modified compounds thereof. Modified 4,4' diphenylmethane diisocyanate may be obtained from ICI of West Deptford, Del., under the tradename Rubinate® LF-168.

The container used in the mixing and blending of the prepolymer permits the exclusion or purging of moisture from the atmosphere adjacent to the prepolymer. This purging occurs prior to the mixing of the prepolymer component parts so that the prepolymer remains unreacted or chemically unaltered. Generally, moisture exclusion occurs through displacing the moisture containing ambient air over the solvent with an inert gas, such as nitrogen, argon, helium, and other such gases. Preferably, nitrogen is used. The nitrogen caps the solvent at greater than ambient pressure to displace the ambient air with the nitrogen, while maintaining a pressure low enough to introduce the acrylic-based polymer into the solvent. Preferably, the pressure of the capping nitrogen ranges from about 2 psi to about 20 psi, more preferably from about 5 psi to about 15 psi, and most preferably from about 8 psi to about 10 psi. Other methods known in the art to exclude ambient air from the mixture may be used, with the appropriate use of any particular method being determinable by those skilled in the art. Moisture content of the purged atmosphere adjacent to the solvent is preferably less than from about 0.1 percent, more preferably less than from about 0.005 percent, and most preferably less than from about 0.001 percent.

The isocyanate is heated to a reaction temperature for mixing with the diol-triol mixture of from about 140° F. to about 170° F. and stirred. Preferably the isocyanate is heated to from about 140° F. to about 160° F., more preferably from about 150° F. to about 160° F., and most preferably from about 155° F. to about 160° F. The mixed ethylene oxide-capped diol and ethylene oxide-capped triol are slowly added to the isocyanate, 15 either before or after the isocyanate is heated, while the isocyanate is continuously stirred. The prepolymer combination of the isocyanate, ethylene oxide-capped diol and ethylene oxide-capped triol is heated to and maintained at a temperature of from about 140° F. to about 170° F. for at least three hours. The temperature allows the components of the prepolymer to interact. Preferably, the prepolymer combination is heated at a temperature of from about 140° F. to about 160° F., more preferably from about 150° F. to about 160° F., and most preferably from about 155° F. to about 160° F. Preferably, the heating occurs for a period of time of from about 3 hours or more, more preferably from about 3 hours to about 5 hours.

The adhesive composition comprises from about 10 percent by weight to about 90 percent by weight of the prepolymer, more preferably from about 40 percent by weight to about 50 percent by weight, and most preferably from about 42 percent by weight to about 47 percent by weight prepolymer. The amount of ethylene oxide-capped diol within the adhesive composition ranges preferably from about 13 percent by weight to about 31 percent by weight, and more preferably from about 17 percent by weight to about 21 percent by weight. The amount of ethylene oxide-capped triol within the adhesive composition ranges preferably from about 10 percent by weight to about 25 percent by weight, and more preferably from about 14 percent by weight to about 17 percent by weight. The amount of isocyanate within the adhesive composition ranges preferably from about 6 percent by weight to about 15 percent by weight, and more preferably from about 8 percent by weight to about 10 percent by weight.

The prepolymer and acrylic solvent are mixed and blended together sufficiently to dissolve the prepolymer. The prepolymer is slowly added to the acrylic solvent to ensure proper solubilization of the prepolymer with the solvent. Preferably the prepolymer is added to the acrylic solvent mixture at a rate of from about 0.1 weight percent per second to about 0.6 weight percent per second, more preferably from about 0.2 weight percent per second to about 0.4 weight percent per second. Blending times preferably range from about 30 minutes to about 4 hours, more preferably from about 1 hour to about 3 hours, and most preferably from about 2 hours to about 3 hours.

The adhesive composition or product of the present invention is derived from about 10 to about 90, more preferably from about 40 to about 50, and most preferably from about 42 to about 47 percent by weight of prepolymer; from about 5 to about 85, more preferably from about 8 to about 15, and most preferably from about 10 to about 12 percent by weight of acrylic-based copolymer; and from about 5 to about 85, more preferably from about 40 to about 50, and most preferably from about 42 to about 47 percent by weight of solvent.

Viscosity of the adhesive composition varies on the type of application of the adhesive, such as spraying, painting, extruding and other known application methods. Preferably the viscosity ranges from about 800 cpi (centipoise per inch) to about 2000 cpi, more preferably from about 1000 cpi to about 1500 cpi, and most preferably from about 1100 cpi to about 1300 cpi. Viscosity may be varied by amount of solvent, molecular weight of the diol and/or triol, and other such factors, the appropriate viscosity for a given application method being determinable by those skilled in the art.

The adhesive product is made by the process of purging moisture from a first container containing a chloride-based solvent; mixing an acrylic copolymer with the chloride-based solvent in the first container; blending the mixed acrylic copolymer and solvent sufficiently to dissolve the copolymer into an acrylic solvent mixture; purging moisture from a second container containing an isocyanate; mixing an ethylene oxide-capped diol and an ethylene oxide-capped triol into the isocyanate in the second container to form a prepolymer mixture; blending the prepolymer mixture sufficiently to form a homogeneous prepolymer mixture; heating the homogeneous prepolymer mixture to a temperature of from about 140° F. to about 170° F. for a time period of from about 3 hours or more; cooling the heated homogeneous prepolymer mixture to a temperature of from about 65° F. to about 100° F.; mixing the cooled homogeneous prepolymer mixture in the acrylic solvent mixture; and, blending the mixed homogeneous prepolymer mixture and acrylic solvent mixture sufficiently to form a homogeneous adhesive composition.

The composition of the present invention may be prepared at a factory as a single component adhesive which is shipped to a customer. Alternatively, the prepolymer mixture and acrylic solvent mixture may leave the factory as separate components and be blended at a work site. Application of the adhesive may be by spraying, painting, extruding, or like methods, the adhesive composition onto a substrate, or on the base of the outdoor carpet. After the adhesive composition is applied, the carpet is placed in contact with the substrate or flooring with the adhesive composition therebetween.

The applied adhesive composition is moisture cured once applied between the carpet and substrate. The solvent is allowed to evaporate, exposing the prepolymer mixture and acrylic copolymer combination to ambient air. The moisture in the ambient air cures the adhesive. Using the preferred chloride-base solvent, the non-flammable evaporating solvent does not create an explosive composition within any covering or dome over the outdoor carpet. The adhesive composition exhibits a high green strength, while providing resistance to the weather and forces normally associated with the use of outdoor carpet.

EXAMPLE 1

In a first container, 1350 grams of methylene chloride solvent was capped with 5–10 psi nitrogen. 300 grams of a methylmethacrylate butadiene copolymer was slowly added to the methylene chloride in the first container while mixing. The methylmethacrylate butadiene copolymer and methylene chloride were blended for 2–3 hours to sufficiently form a homogeneous acrylic solvent mixture. In a second container, 595 grams of an ethylene oxide-capped diol having an average molecular weight of 4000, sold under the tradename Poly-G® 55-28, was mixed with 472.5 grams of an ethylene oxide-capped triol having an average molecular weight of 6500, sold under the tradename Poly-G® 85-29.

In a third container, 283.5 grams of a 4,4' diphenylmethane diisocyanate, sold under the tradename Rubinate® 1680, was capped with 5–10 psi nitrogen. The isocyanate was stirred and heated to a temperature of from about 140° F. to about 170° F. The diol-triol mixture was blended into the isocyanate in the third container until a homogeneous prepolymer mixture was formed. The prepolymer mixture was heated to a temperature of 150° F. for four hours. The prepolymer mixture was cooled to a temperature of 75° F. The prepolymer mixture was then slowly added to the acrylic solvent mixture in the first container composition. The two components were blended sufficiently to form a homogeneous adhesive composition.

EXAMPLE 2

An adhesive composition was formed following the procedure of Example 1, having 450 grams of the methylmethacrylate butadiene copolymer, 528 grams of the ethylene oxide-capped diol, 420 grams of the ethylene oxide-capped triol, and 252 grams of the 4,4' diphenylmethane diisocyanate.

EXAMPLE 3

An adhesive composition was formed following the procedure of Example 1, having 240 grams of the methylmethacrylate butadiene copolymer, 620.4 grams of the ethylene oxide-capped diol, 493.5 grams of the ethylene oxide-capped triol, and 296.1 grams of the 4,4' diphenylmethane diisocyanate.

EXAMPLE 4

An adhesive composition was formed following the procedure of Example 1, using toluene diisocyanate instead of 4,4' diphenylmethane diisocyanate.

Test Procedure

The adhesive compositions formed in Examples 1–4 were tested. A 10 mil wet film was cast on a piece of polyethylene foam using a draw down blade. The film was given approximately a five minute open-time to allow the solvent to evaporate. A piece of outdoor carpet was pressed into the adhesive, withdrawn slowly, and based on its "feel" was rated as oily or tacky. A material that was rated as tacky also had high green strength, legs and grab. The green strength and grab was rated on a 1–10 scale, 1 being low grab and 10 being the highest grab.

The resulting samples were allowed to condition for five days at 75° and 60% relative humidity. The adhesive cures by the reaction of the isocyanate groups on the prepolymer mixture with water from the atmosphere. After the five days of conditioning, the samples were tested for shear adhesion on an Instron machine. Shear adhesion and work to foam pad tear were evaluated at a cross head speed of 2.0 inches per minute.

Table I lists a summary of the formulations and properties of the adhesive compositions of Examples 1–4. Additionally, the results of the Test Procedure for Examples 1–4 also are listed in Table I. Grab numbers are shown as Finger Tack and Green Strength (finger), and the shear adhesion and word to foam pad tear are shown as Shear adhesion strength (psi) and Resulting foam pad condition.

TABLE I

|  | Example 1 | Example 2 | Example 3 | Example 4 |
|---|---|---|---|---|
| FORMULA | | | | |
| MDI isocyanate terminated prepolymer | 45% | 40% | 47% | — |
| TDI isocyanate terminated prepolymer | — | — | — | 45% |
| Methylene Chloride | 45% | 45% | 45% | 45% |
| Methylmethacrylate butadiene copolymer | 10% | 15% | 8% | 10% |
| PROPERTIES | | | | |
| Viscosity(cps) | 1100 | 1750 | 975 | 750 |
| Solution solids (% by weight) | 55 | 55 | 55 | 55 |
| Finger Tack | Tacky | Tacky, legs | Oily | Oily |
| Green Strength (finger) | 7 | 8.5 | 2 | 5 |
| Shear adhesion strength (psi) | 10.5 | 15.3 | 5.2 | 8.8 |
| Resulting foam pad condition | Pad tear | Pad tear | No pad tear | Pad tear |

As can be seen in Table I, the Finger Tack, Green Strength and Shear adhesion strength improve with an increase in the amount of acrylic and/or a decrease in the amount of prepolymer.

The foregoing summary, description, examples, and drawing of the invention are not intended to be limiting, but are only exemplary of the inventive features which are defined in the claims.

What is claimed is:

1. A process for forming a non-flammable adhesive composition comprising the steps of purging moisture from a first container containing a chloride-based solvent;

mixing an acrylic copolymer with the chloride-based solvent in the first container;

blending the mixed acrylic copolymer and solvent sufficiently to dissolve the acrylic copolymer into an acrylic solvent mixture;

purging moisture from a second container containing an isocyanate;

mixing an ethylene oxide-capped diol and an ethylene oxide-capped triol into the isocyanate in the second container to form a prepolymer mixture;

blending the prepolymer mixture sufficiently to form a homogeneous prepolymer mixture;

heating the homogeneous prepolymer mixture to a temperature of from about 140° F. to about 170° F. for a time period of from about 3 hours or more;

cooling the heated homogeneous prepolymer mixture to a temperature of from about 65° F. to about 100° F.;

mixing the cooled homogeneous prepolymer mixture with the acrylic solvent mixture; and, blending the mixed homogeneous prepolymer mixture and acrylic solvent mixture sufficiently to form a homogeneous adhesive composition.

2. The process of claim 1, wherein the chloride-based solvent is selected from the group consisting of methyl chloride, methylene chloride, 1,1,1-trichloroethane, dichloroethane, chloroform, hydrochloroflorocarbon, and mixtures thereof.

3. The process of claim 2, wherein the chloride-based solvent comprises methylene chloride.

4. The process of claim 1, wherein the acrylic copolymer comprises methylmethacrylate and butadiene copolymer.

5. The process of claim 1, wherein the first and second containers are purged of moisture by capping with nitrogen.

6. The process of claim 1, wherein the homogeneous adhesive composition comprises from about 5 percent by weight to about 85 percent by weight of chloride-based solvent.

7. The process of claim 6, wherein the homogeneous adhesive composition comprises from about 42 percent by weight to about 47 percent by weight of chloride-based solvent.

8. The process of claim 1, wherein the homogeneous prepolymer mixture is heated for a time period of from about 3 hours to about 5 hours.

9. The process of claim 1, wherein the homogeneous prepolymer mixture is heated to a temperature of from about 150° F. to about 160° F. prior to cooling.

10. The process of claim 1, wherein the isocyanate is continuously stirred as the diol and triol are mixed therein.

11. The process of claim 1, wherein from about 42 percent by weight to about 47 percent by weight of the adhesive composition comprises the prepolymer mixture.

12. The process of claim 1, wherein the adhesive composition comprises from about 10 percent by weight to about 12 percent by weight of acrylic copolymer.

13. The process of claim 1, wherein the adhesive composition comprises from about 42 percent by weight to about 47 percent by weight of the chloride-based solvent.

14. An adhesive product made by the process comprising the steps of:

purging moisture from a first container containing a chloride-based solvent;

mixing an acrylic copolymer with the chloride-based solvent in the first container;

blending the mixed acrylic copolymer and solvent sufficiently to dissolve the acrylic copolymer into an acrylic solvent mixture;

purging moisture from a second container containing an isocyanate;

mixing an ethylene oxide-capped diol and an ethylene oxide-capped triol into the isocyanate in the second container to form a prepolymer mixture;

blending the prepolymer mixture sufficiently to form a homogeneous prepolymer mixture;

heating the homogeneous prepolymer mixture to a temperature of from about 140° F. to about 170° F. for a time period of from about 3 hours or more;

cooling the heated homogeneous prepolymer mixture to a temperature of from about 65° F. to about 100° F.;

mixing the cooled homogeneous prepolymer mixture with the acrylic solvent mixture; and, blending the mixed homogeneous prepolymer mixture and acrylic solvent mixture sufficiently to form a homogeneous adhesive composition.

* * * * *

UNITED STATES PATENT AND TRADEMARK OFFICE
CERTIFICATE OF CORRECTION

PATENT NO. : 6,025,434
DATED : February 15, 2000
INVENTOR(S) : Kevin W. Light

It is certified that error appears in the above-identified patent and that said Letters Patent is hereby corrected as shown below:

In the cover sheet at [73] Assignee:,
insert --- Isotec International, Inc., Canton Ga.---.

Signed and Sealed this

Twenty-second Day of August, 2000

Q. TODD DICKINSON

Attest:

Attesting Officer

Director of Patents and Trademarks